July 23, 1968  Z. M. SURLETTA ET AL  3,393,895
SPRING ASSEMBLY SPREADER
Filed Nov. 10, 1966
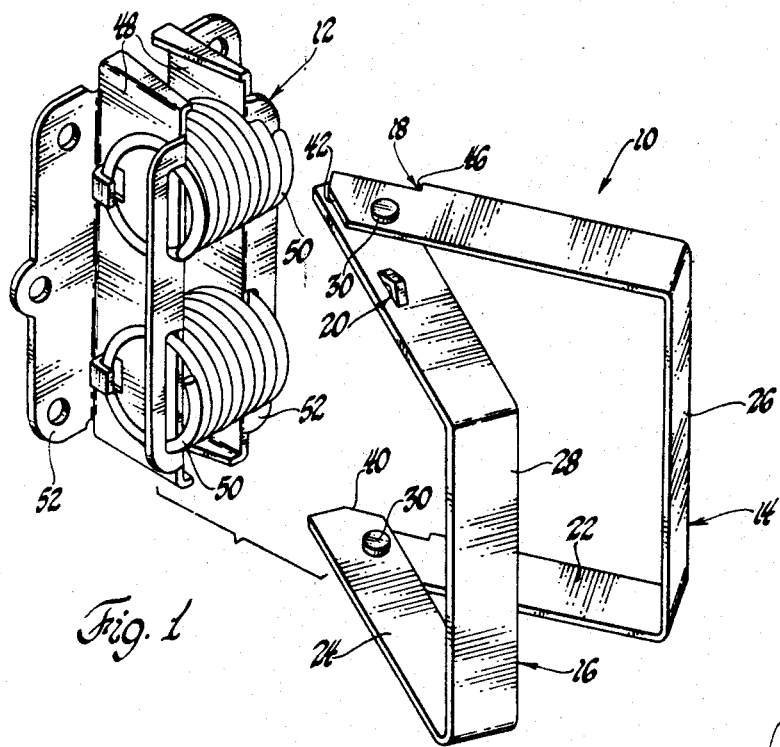
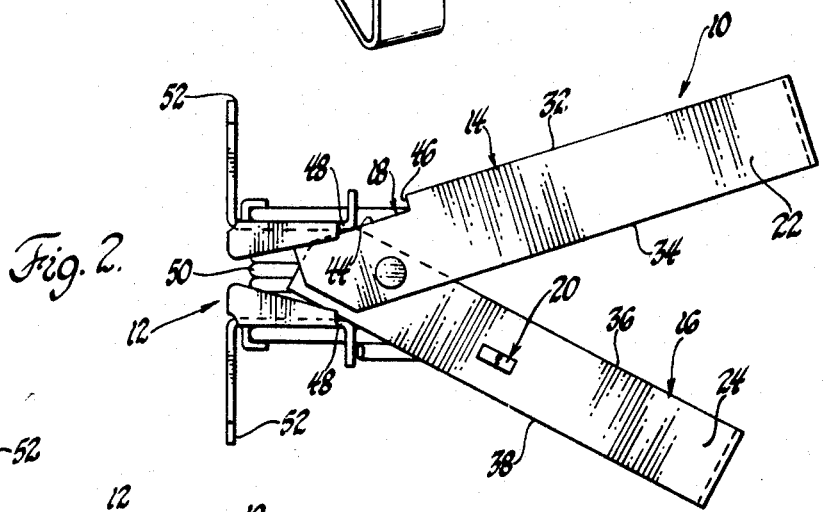
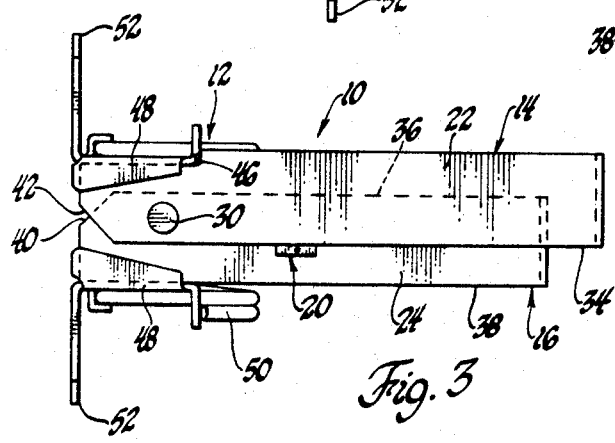
INVENTORS
Zygmunt M. Surletta,
Robert F. O'Dell, &
Bobby Malone
Barnard, McGlynn & Reising
ATTORNEYS

United States Patent Office 3,393,895
Patented July 23, 1968

3,393,895
SPRING ASSEMBLY SPREADER
Zygmunt M. Surletta, Detroit, Mich., and Robert F. O'Dell, Ridgeland, and Bobby Malone, Jackson, Miss., assignors, by mesne assignments, to Lear Siegler, Inc., Santa Monica, Calif., a corporation of Delaware
Filed Nov. 10, 1966, Ser. No. 593,559
6 Claims. (Cl. 254—10.5)

ABSTRACT OF THE DISCLOSURE

A spring spreader comprising two U-shaped members each of which has straight parallel legs interconnected by end cross bars with adjacent legs of each member pivotally connected together adjacent the distal end of the legs with the pivot point being closer to one edge of the respective legs than the other and including first stop means for limiting the amount of insertion into a spring assembly and second stop means for limiting relative pivotal movement between the first and second members.

---

This invention relates to a spring assembly spreader which is utilized to position a spring assembly for installation in a piece of furniture, such as a platform rocking chair.

More specifically, the spreader of the instant invention is particularly suited for positioning a spring assembly of the type utilized for interconnecting the platform and the rocking assembly of a platform rocker. The spring assembly with which the instant invention is particularly adapted comprises a pair of parallel plates which are held together by a plurality of coil springs. When the spring assembly is attached to a platform rocker, or the like, the plates must be moved apart against the biasing action of the springs so that each plate may be attached to different relatively movable components of a platform rocker. The plates normally have holes, or the like, through which screws or bolts are inserted to secure the plates to the components of the rocker. Heretofore it has been very difficult to maintain the plates apart against the biasing action of the springs and in the proper relative disposition for attachment to the relatively movable components of a rocker assembly.

Accordingly, it is an object and feature of this invention to provide a spring spreader assembly which may be inserted between the plates of a spring assembly to move the plates apart against the biasing action of the springs and to maintain the plates apart and in the desired relative disposition for attachment to different relatively movable components of a rocker assembly.

In general, this and other objects and features of this invention may be attained in a spreader comprising first and second substantially U-shaped members. Each U-shaped member includes a pair of legs which are pivotally connected to the legs of the other member adjacent the distal ends thereof, and one of the U-shaped members is disposed within the other U-shaped member. The distal ends of the legs of each of the U-shaped members are tapered so that when the U-shaped members are pivoted relative to one another so as to form an acute angle between the legs of one U-shaped member and the legs of the other U-shaped member, there is formed a wedge which may be inserted between the plates of a spring assembly. After the wedge-shaped ends of the legs of the U-shaped members are inserted between the plates of the spring assembly, the U-shaped members are pivoted relative to one another to a non-coextensive parallel relationship to move the plates of the spring assembly apart. The legs of one of the U-shaped members has a recess adjacent the distal ends of the legs thereof to form a shoulder which is in spaced relationship to the distal ends so that once the U-shaped members are moved to the substantially parallel position, they may be inserted further between the plates of the spring assembly until the shoulder contacts one of the plates. At this position, the plates are held apart against the biasing action of the springs and there is included a stop means coacting between the U-shaped members to limit movement thereof so that the U-shaped members are maintained in the parallel relationship and maintain the plates of the spring assembly disposed in the desired position for attachment to different relatively movable components of a rocker assembly.

Other objects and attendant advantages of the present invention will be readily appreciated as the same becomes better understood by reference to the following detailed description when considered in connection with the accompanying drawings wherein:

FIGURE 1 is a perspective view of a preferred embodiment of the instant invention shown in relative position to a spring assembly;

FIGURE 2 is a side elevational view of the preferred embodiment of the instant invention shown in wedging engagement with the spring assembly; and FIGURE 3 is a side elevational view of the preferred embodiment of the invention shown in coacting engagement with the spring assembly for maintaining the spring assembly in a position for attachment to different relatively movable components of a rocker assembly.

Referring now to the drawings, wherein like numerals indicate like or corresponding parts throughout the several views, a spring assembly spreader is generally shown at 10 and a spring assembly with which the spreader 10 is utilized is generally shown at 12.

The spreader comprises first and second means 14 and 16 which are operatively connected together for movement between the inserting portion shown in FIGURE 2 and the spread position shown in FIGURE 3. There is also included a stop means, generally indicated at 18, for limiting the amount of insertion of the spreader 10 into the spring assembly 12. There is also included an additional stop means, generally indicated at 20, for limiting the relative movement between the first and second means 14 and 16 in the spread position as illustrated in FIGURE 3.

The first means 14 comprises a substantially U-shaped member having a pair of spaced parallel legs 22. The second means 16 is also a substantially U-shaped member having a second pair of spaced parallel legs 24. Each pair of legs 22 and 24 are interconnected adjacent the first ends thereof by the respective crossbars 26 and 28. The legs 24 of one of the U-shaped members are disposed between the legs 22 of the other U-shaped member. Each leg 22 is pivotally connected to a leg 24 of the other pair at a pivot point 30, each pivot point 30 being spaced from the second ends of the respective legs. Each leg 22 has an upper edge 32 which is parallel to lower edge 34 and the edges 32 and 34 extend between the ends of the legs 22 as viewed in side elevation. The legs 24 also have upper edges 36 which are parallel to the lower edges 38 and which extend between the ends of the legs 24 as viewed in side elevation. The pivot points 30 are disposed closer to one edge than the other of the respective legs 22 and 24. That is to say, the pivot points 30 are disposed closer to the edges 34 than the edges 32 of the legs 22 and closer to the edges 36 than the edges 38 of the legs 24. Thus, the legs 22 are in overlapping and non-coextensive relationship with the legs 24 as viewed in side elevation in the spread position illustrated in FIGURE 3.

It will be noted that the second ends of each of the legs 22 and 24 are tapered, as indicated at 40 and 42 respectively; thus, the legs 22 and 24 coact to form a wedge when in the inserting position illustrated in FIGURES 1 and 2. Also, the tapered portions 40 of the legs 24 are in crossed overlapping relationship with the tapered portions 42 of the other pair of legs 22 when viewed in side elevation in the spread position illustrated in FIGURE 3.

The first-mentioned stop means 18 comprises a recess 44 which extends from the second ends of the legs 22 to form the shoulders 46 in spaced relationship to the distal ends of the legs 22. The additional stop means 20 comprises at least one projection extending from the legs 24 to engage the lower edge 34 of the legs 22 to limit the pivotal movement between the legs 22 and the legs 24 in one direction when in the spread position as illustrated in FIGURE 3.

Thus, the instant invention provides a spring assembly spreader 10 which coacts with a spring assembly 12 for positioning the spring assembly for attachment to two relatively movable components of a rocker assembly. More specifically, the spreader 10 may be wedgedly inserted between a pair of parallel plates 48 which are held together by a pair of coil springs 50. Once the spreader 10 is wedgedly inserted between the plates 48, as illustrated in FIGURE 2, it may be actuated by moving the substantially U-shaped members together to move the plates 48 apart against the biasing action of the spring 50. Thereafter, the substantially U-shaped members may be inserted further between the plates 48 to the position illustrated in FIGURE 3 to maintain the plates 48 apart so that the plates may be attached to different relatively movable components of the rocker assembly. The plates 48 have flanges 52 extending therefrom with holes therein for receiving screws or bolts to attach the flanges to different relatively movable components of a rocker assembly. Once the spreader is in the position illustrated in FIGURE 3, the plates bear against the substantially U-shaped members to hold the lower edge 34 of the legs 22 against the stop means 22 of the legs 24. Thus, while the spreader 10 is in the position illustrated in FIGURE 3, the plates 48 are held apart against the biasing action of the springs 50 and may be positioned for inserting screws through the flanges 52 for attaching the spring assembly to a rocker assembly.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A spring assembly spreader comprising: a first member having a pair of spaced parallel legs; a second member having a pair of spaced parallel legs; each pair of legs being interconnected adjacent a first end thereof; each leg being pivotally connected to a leg of the other pair at a pivot point closer to the second ends thereof than to the first ends thereof for pivotal movement between an inserting position and a spread position; said legs having upper and lower edges as viewed in side elevation; said pivot points being disposed closer to one edge than the other in at least one of said pair of legs so that said legs may be pivoted between said inserting position, where said pairs of legs are diverging between said pivot points and said first ends, and are overlapping with opposite edges converging on the opposite side of said pivot points, and said spread position, where said pairs of legs are in overlapping noncoextensive relationship with one another; first stop means for limiting the amount of insertion of said second ends into a spring assembly; said stop means being disposed between the pivotal connections of said legs and said first ends so that a spring assembly into which said spreader is inserted will maintain said spreader in said spread position.

2. A spring assembly spreader as set forth in claim 1 wherein the second ends of each of said legs are tapered so that said pairs of legs coact to form a wedge when in said inserting position.

3. A spring assembly spreader as set forth in claim 2 wherein said first stop means comprises a recess which forms a shoulder in spaced relation to the second ends of each of said legs of one of said pairs of legs.

4. A spring assembly spreader as set forth in claim 3 wherein an additional stop means comprises at least one projection extending from one of said legs of one pair to engage the edge of one of the legs of the other pair to limit pivotal movement between said pairs of legs in one direction in said spread position.

5. A spring assembly spreader as set forth in claim 4 wherein each of said pair of legs are integrally connected adjacent the second ends thereof by a crossbar thereby forming two substantially U-shaped members, the legs of one of said U-shaped members being disposed between the legs of the other U-shaped member.

6. In a spring assembly spreader which may be wedgingly inserted between a pair of parallel plates held together by at least one spring and actuated to move the plates apart against the biasing of the springs and inserted further between the plates to maintain the plates apart so that the plates may be attached to relatively movable components while held apart, after which the spreader is removed from between the plates, the improvement comprising; a first substantially U-shaped member having a first pair of legs, a second substantially U-shaped member having a second pair of legs, said second U-shaped member being disposed within said first U-shaped member, said first pair of legs being pivotally connected to said second pair of legs in spaced relation to the distal ends thereof so that said first and second U-shaped members may be pivoted relative to one another between an inserting position where said first pair of legs form an acute angle with said second pair of legs and a spread position where said first pair of legs are substantially parallel to and offset from said second pair of legs, said distal ends of said legs being tapered to form a wedge when in said inserting position so that said legs may be inserted between the plates of the spring assembly, and at least one projection extending from one of said legs to one pair for engaging one of the legs of the other pair to limit relative pivotal movement in one direction between said first and second substantially U-shaped members in said spread position so that said U-shaped members may be pivoted from said inserting position to said spread position to move the plates of the spring assembly apart, the legs of one of said U-shaped members having a recess at the distal ends thereof to form a shoulder in spaced relation to said distal ends so that after said U-shaped members are pivoted to said spread position, said legs thereof may be inserted further between the plates of the spring assembly until said shoulder engages one of the plates where said U-shaped members are maintained in said spread position and maintain plates of the spring assembly moved apart.

References Cited

UNITED STATES PATENTS

| 1,074,058 | 9/1913 | Maxwell et al. | 81—302 X |
| 1,333,966 | 3/1920 | Fay | 29—221 |
| 1,358,860 | 11/1920 | Lueders | 254—105 |
| 2,883,742 | 4/1959 | Prath | 254—105 |
| 2,897,701 | 8/1959 | Strnisha | 81—302 X |
| 3,177,567 | 4/1965 | Gehrman | 20—268 X |
| 1,143,253 | 6/1915 | Constantine | 81—419 X |
| 2,106,584 | 1/1938 | Whiting | 81—5.1 X |

MILTON S. MEHR, *Primary Examiner.*